(12) United States Patent
Sinha et al.

(10) Patent No.: US 9,891,654 B2
(45) Date of Patent: Feb. 13, 2018

(54) SECURE CLOCK SWITCH CIRCUIT

(71) Applicant: FREESCALE SEMICONDUCTOR, INC., Austin, TX (US)

(72) Inventors: Rohit K. Sinha, Noida (IN); Vandana Sapra, Rohini (IN); Mandeep Singh, New Delhi (IN); Sidharth S. Singh, Azamgarh (IN); Neha Srivastava, Noida (IN)

(73) Assignee: NXP USA, INC., Austin, TX (US)

( * ) Notice: Subject to any disclaimer, the term of this patent is extended or adjusted under 35 U.S.C. 154(b) by 60 days.

(21) Appl. No.: 15/041,020

(22) Filed: Feb. 10, 2016

(65) Prior Publication Data

US 2017/0227982 A1 Aug. 10, 2017

(51) Int. Cl.
*G06F 1/00* (2006.01)
*G06F 1/10* (2006.01)
*G06F 1/08* (2006.01)

(52) U.S. Cl.
CPC . *G06F 1/10* (2013.01); *G06F 1/08* (2013.01)

(58) Field of Classification Search
CPC .......... G06F 1/08; G06F 11/1604; G06F 1/14; G06F 21/75; H03K 5/19
See application file for complete search history.

(56) References Cited

U.S. PATENT DOCUMENTS

| 4,698,750 | A | 10/1987 | Wilkie | |
|---|---|---|---|---|
| 5,604,713 | A * | 2/1997 | Short | G06F 21/74 365/189.04 |
| 5,737,760 | A | 4/1998 | Grimmer | |
| 6,429,698 | B1 | 8/2002 | Young | |
| 8,533,517 | B2 | 9/2013 | Gregie | |
| 8,860,468 | B1 | 10/2014 | Khandelwal | |
| 8,909,971 | B2 | 12/2014 | Zinke | |
| 2002/0097075 | A1 * | 7/2002 | Ono | H03K 5/1534 327/175 |
| 2003/0115503 | A1 | 6/2003 | Lehman | |
| 2003/0212897 | A1 | 11/2003 | Dickerson | |

* cited by examiner

*Primary Examiner* — Austin Hicks
(74) *Attorney, Agent, or Firm* — Charles E. Bergere

(57) ABSTRACT

An integrated circuit (IC) having a clock switch that switches the system clock between an internal clock and an external clock based on whether or not the IC has finished downloading device configuration at boot and on whether or not the internal clock is functional. Further restrictions on the use of the external clock are imposed by the clock switch based on a life-cycle state of the IC. The use of the clock switch makes it significantly more difficult for the clock to be tampered with, thereby protecting the security settings of the IC and/or preventing unauthorized access to secure data stored on the IC using an external-clock-based security attack.

13 Claims, 8 Drawing Sheets

FIG. 2

| LIFE CYCLE STATE | ASSOCIATED FUNCTIONALITY | SECURITY_LEVEL |
|---|---|---|
| CHIP MANUFACTURE | FULL DEBUG CAPABILITY ALLOWED. NO SECURITY FEATURE ACTIVE. | 0 |
| DEVICE MANUFACTURE | SOME DEBUG CAPABILITY ALLOWED. SECURITY FEATURES PARTIALLY ACTIVE. | 1 |
| SECURE (IN FIELD) | ONLY AUTHORIZED DEBUG SESSIONS ALLOWED. FULL SECURITY. | 1 |
| FAILURE ANALYSIS | FULL DEBUG CAPABILITY ALLOWED. NO SECURITY FEATURE ACTIVE. | 0 |

300

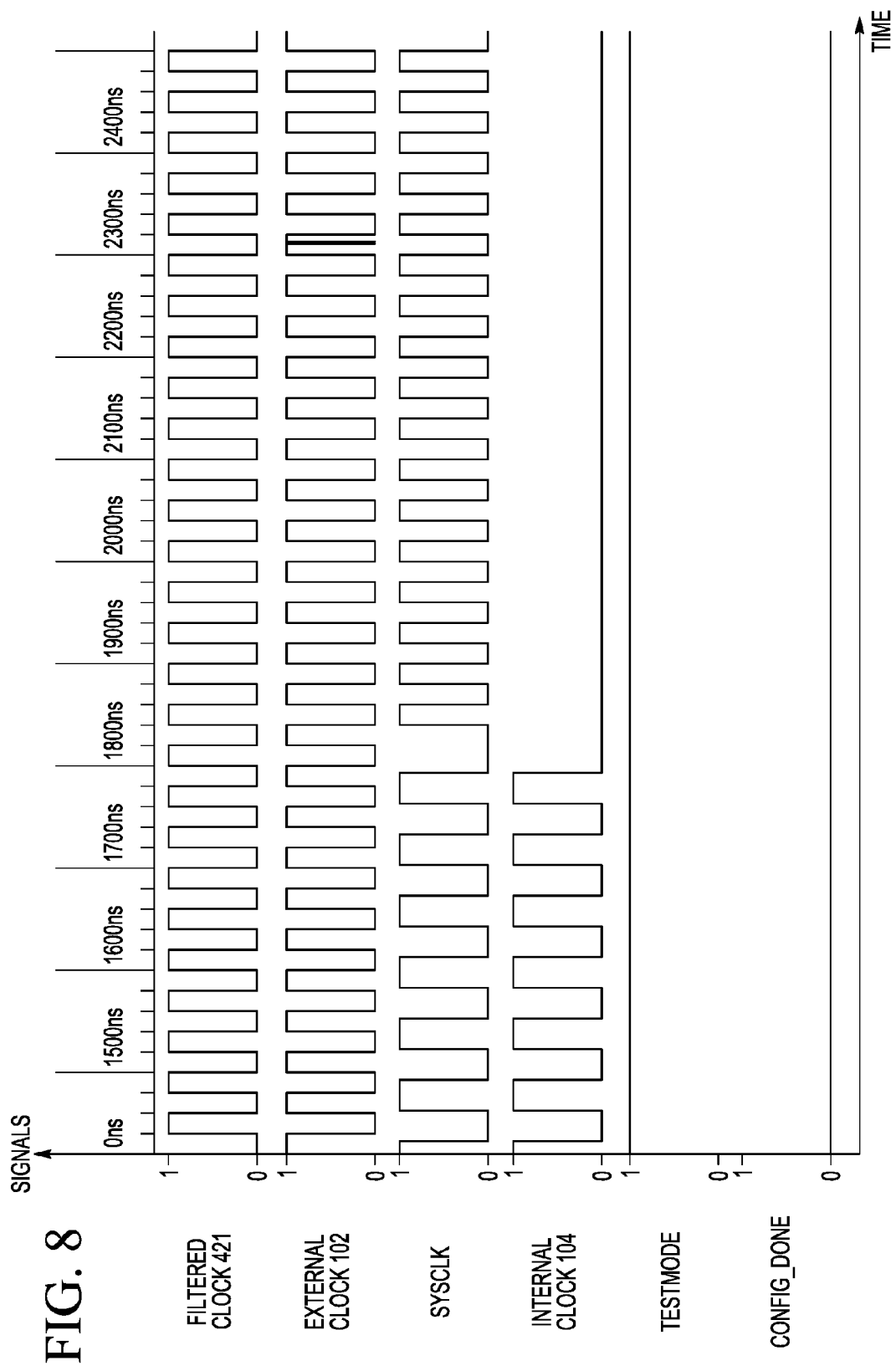

SECURE CLOCK SWITCH CIRCUIT

BACKGROUND

The present invention relates generally to clock-switching circuits and methods and, more particularly, to security-compliant clock switching.

The timing of the functions performed by an integrated circuit (IC) is regulated by a clock. As integration and system complexity has increased, ICs have employed multiple clocks running at different frequencies so that each particular IC function can be clocked at an optimal rate for that particular function. A clock switch is a circuit used to change the system clock when appropriate or necessary. Some clock switches enable the host IC to switch the system clock between an externally generated clock (referred to as an external clock) and an internally generated clock (referred to as an internal clock).

BRIEF DESCRIPTION OF THE DRAWINGS

Embodiments of the present invention(s) are illustrated herein by way of example and are not limited by the accompanying figures, in which like references indicate similar elements. Elements in the figures are illustrated for simplicity and clarity and have not necessarily been drawn to scale. Various aspects, features, and benefits of the disclosed embodiments will become more fully apparent, by way of example, from the following detailed description that refers to the accompanying figures, in which:

FIG. 2 is a table that illustrates security-level changes during the life cycle of the IC of FIG. 1 according to an embodiment of the invention;

FIGS. 6-8 are timing diagrams that graphically illustrate various signals that can be generated in the electrical circuit of FIG. 4 according to an embodiment of the invention.

DETAILED DESCRIPTION

Figure 1:
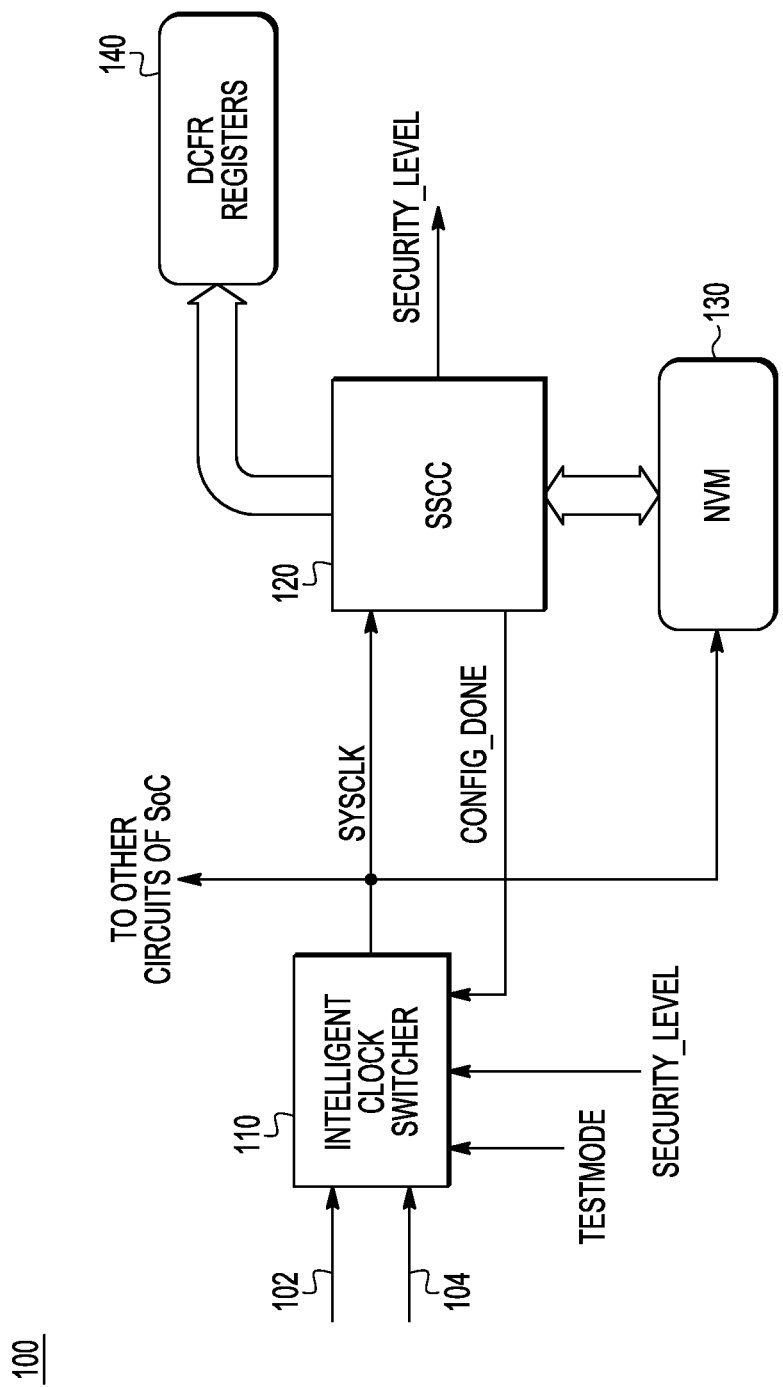
FIG. 1 is a schematic block diagram of an IC according to an embodiment of the invention.

Detailed illustrative embodiments of the present invention are disclosed herein. However, specific structural and functional details to which the disclosure refers are merely representative for purposes of describing example embodiments of the present invention. Embodiments of the present invention may be embodied in many alternative forms and should not be construed as limited to only the embodiments set forth herein.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative embodiments, certain functions or acts may occur out of the order indicated in the figures.

As used herein, the terms "assert" and "de-assert" are used when referring to the rendering of a control signal, status bit, or other relevant functional feature or element into its logically true and logically false state, respectively. If the logically true state is a logic level one, then the logically false state is a logic level zero. Alternatively, if the logically true state is logic level zero, then the logically false state is logic level one.

In various alternative embodiments, the logic signals described herein may be generated using positive or negative logic circuitry. For example, in the case of a negative logic signal, the signal is low active, and the logically true state corresponds to a logic zero. Alternatively, in the case of a positive logic signal, the signal is high active, and the logically true state corresponds to a logic one.

A conventional clock switch is typically implemented using a signal multiplexer whose input-select control signal causes the multiplexer to pass through a selected one of the clock signals received at its inputs. Disadvantageously, such a conventional clock switch does not support any security features of the host IC, which can potentially be exploited by a hacker, for example, by configuring the multiplexer to select an external clock signal as the system clock. The selected external clock signal can then be manipulated beyond a specified frequency, which may corrupt the device-configuration data downloaded at boot from the flash memory or fuse box. The corrupted device-configuration data may then cause the IC to go into an unknown or non-secure state and display undesired or errant behavior, which can be exploited by a hacker to alter or expose the secure data stored on chip.

At least some of the above-indicated problems in the prior art are addressed by an IC having a clock switch that switches the system clock between an internal clock and an external clock based on whether or not the IC has finished downloading the device configuration at boot and on whether or not the internal clock is functional. Further restrictions on the use of the external clock are imposed by the clock switch based on the current life-cycle state of the IC. The use of this clock switch beneficially makes it significantly more difficult for a hacker to tamper with the security settings of the IC and/or to gain access to secure data stored on chip using an external-clock-based security attack. Such a security attack can be perpetrated, e.g., using a peripheral TESTMODE pin and/or another relevant external port.

One embodiment of the present invention is an IC comprising: an embedded nonvolatile memory (NVM) having stored therein device configuration data corresponding to the IC; a configuration circuit that sets an operative configuration of the IC based on the device configuration data retrieved from the embedded NVM; and a clock switch that selects a system clock of the IC from a first clock and a second clock, where the selection is performed based on whether or not the configuration circuit has finished setting the operative configuration of the IC.

Another embodiment of the present invention is a method of selecting a system clock in an IC. The method comprises the steps of: storing device configuration data corresponding to the IC in an embedded NVM; setting an operative configuration of the IC based on the device configuration data retrieved from the embedded NVM; and selecting the system clock from a first clock and a second clock, wherein the selecting is performed based on whether or not the step of setting the operative configuration has been completed.

Referring now to FIG. 1, a block diagram of an IC 100 according to an embodiment of the invention is shown. The IC 100 can operate using an external clock 102 or an internal clock 104. The external clock 102 is generated by an external clock generator and is received by the IC 100 using a corresponding peripheral pin or pad (not explicitly shown in FIG. 1). The internal clock 104 is generated by the IC 100 itself, e.g., using an on-chip clock generator (not explicitly shown in FIG. 1). One of the clocks 102 and 104 can be selected by an intelligent clock switch 110 as the system clock, which is labeled in FIG. 1 as SYSCLK. The system clock SYSCLK is used in the IC 100 to clock various sub-circuits thereof, such as a system status and configuration circuit (SSCC) 120 and a nonvolatile memory (NVM) 130, as indicated in FIG. 1.

The SSCC 120 operates to scan the NVM 130 for device configuration data stored therein when the IC 100 is being powered-up or is coming out of reset. Based on the device configuration data retrieved from the NVM 130, the SSCC 120 generates device-configuration-format (DCF) records and loads the records into DCF-records (DCFR) registers 140. The DCF records stored in the DCFR registers 140 determine the behavior of the IC 100, as various sub-circuits thereof may retrieve and/or refer to the pertinent portions of the DCF records during their normal operation.

Based on the device configuration data retrieved from a one-time-programmable (OTP) region of the NVM 130 (not explicitly shown in FIG. 1), the SSCC 120 also generates a control signal SECURITY_LEVEL that determines which security features, if any, the various security modules of the IC 100 will apply to protect the functions and data of the corresponding sub-circuits thereof. After the control signal SECURITY_LEVEL is set to an appropriate value and the DCF records are loaded into the DCFR registers 140, the SSCC 120 asserts the control signal CONFIG_DONE, which is applied to the intelligent clock switch 110 as indicated in FIG. 1.

FIG. 2 is a table that illustrates security-level changes during the life cycle of the IC 100 according to an embodiment of the invention. Four different states of the life cycle are indicated in the table of FIG. 2 as an example. As the IC 100 goes through these states and, in some cases specific sub-states, the OTP region of the NVM 130 is appropriately programmed to reflect these life-cycle transitions. At boot, the SSCC 120 reads the life-cycle information from the NVM 130 and sets the control signal SECURITY_LEVEL (see FIG. 1) to a corresponding appropriate value. In an example embodiment, the control signal SECURITY_LEVEL is a one-bit signal that is distributed within the IC 100 and applied, inter alia, to the intelligent clock switch 110 as indicated in FIG. 1.

At the life-cycle state labeled in FIG. 2 as "chip manufacture," the chip is fabricated and undergoes initial tests and programming at the factory. At this life-cycle state, the value of the control signal SECURITY_LEVEL is set to zero. The zero value of the control signal SECURITY_LEVEL causes any built-in security features of the IC 100 to be inactive, thereby allowing for the full debugging capability.

At the life-cycle state labeled in FIG. 2 as "device manufacture," the chip is incorporated into a corresponding device. At this life-cycle state, the value of the control signal SECURITY_LEVEL is set to one. Depending on the value(s) of one or more other relevant parameters in the DCF records, this value of the control signal SECURITY_LEVEL causes some of the built-in security features of the IC 100 to become active and some to remain inactive.

At the life-cycle state labeled in FIG. 2 as "secure (in field)," the device is being used outside of the facilities of the original equipment manufacturer (OEM). At this life-cycle state, the value of the control signal SECURITY_LEVEL is also set to one. This value of the control signal SECURITY_LEVEL, along with the value(s) of the one or more other relevant parameters in the DCF records, causes all built-in security features of the IC 100 to become active. Only specifically authorized debugging sessions may be allowed in this state.

At the life-cycle state labeled in FIG. 2 as "failure analysis," the device or chip has suffered a failure in the field and is returned back to the OEM for troubleshooting and possible remedial treatment. At this life-cycle state, the value of the control signal SECURITY_LEVEL is again set to zero. As already mentioned above, the zero value of the control signal SECURITY_LEVEL causes any built-in security features of the IC 100 to be inactive, thereby allowing for the full debugging capability.

A person of ordinary skill in the art will understand that other alternative embodiments for the derivation of the control signal SECURITY_LEVEL at different life-cycle states of the IC 100 are also possible.

Referring back to FIG. 1, besides the control signals CONFIG_DONE and SECURITY_LEVEL, the intelligent clock switch 110 receives an additional control signal, which is labeled in FIG. 1 as TESTMODE. In an example embodiment, the IC 100 receives the control signal TESTMODE from an external circuit or device by way of a corresponding peripheral pin or pad (not explicitly shown in FIG. 1). The control signal TESTMODE needs to be asserted for the intelligent clock switch 110 to (eventually) pass the external clock 102 as the system clock SYSCLK. However, in some situations, the intelligent clock switch 110 might not pass the external clock 102 as the system clock SYSCLK even if the control signal TESTMODE is asserted because the clock switching implemented by the intelligent clock switch 110 is further conditioned on the state of the control signals SECURITY_LEVEL and CONFIG_DONE and/or the status of the internal clock 104, e.g., as further described below.

For example, if the control signal TESTMODE is asserted while the control signal CONFIG_DONE is de-asserted, then the intelligent clock switch 110 may first check the status of the internal clock 104. If the intelligent clock switch 110 determines that the internal clock 104 is functional, then the intelligent clock switch 110 causes the internal clock 104 to continue to be used as the system clock SYSCLK until the SSCC 120 finishes loading the DCF records into the DCFR registers 140, generates the control signal SECURITY_LEVEL, and asserts the control signal CONFIG_DONE. Subsequently, the intelligent clock switch 110 may cause the external clock 102 to become the system clock SYSCLK only if the control signal SECURITY_LEVEL is de-asserted. As indicated above, the control signal SECURITY_LEVEL is de-asserted only if the IC 100 is at an appropriate life-cycle state, e.g., a life-cycle state that is deemed to be safe with respect to a clock-related security threat. If the latter is not the case, then the intelligent clock switch 110 causes the internal clock 104 to continue on as the system clock SYSCLK.

If the intelligent clock switch 110 determines that the internal clock 104 is not functional, then the intelligent clock switch 110 may allow the external clock 102 to become the system clock SYSCLK, but only after the external clock 102 is subjected to some additional signal processing (e.g., in a glitch filter) configured to reduce the likelihood of a clock-based security breach or malfunction. Using this particular feature, a legitimate operator of the IC 100 is still able to carry out the necessary troubleshooting and debugging operations to possibly identify and remove the cause of the internal-clock malfunction in the IC 100.

If both the control signal TESTMODE and the control signal CONFIG_DONE are asserted, then the intelligent clock switch 110 may cause the external clock 102 to become the system clock SYSCLK only if the control signal SECURITY_LEVEL is de-asserted. If the control signal SECURITY_LEVEL is asserted, then the intelligent clock switch 110 causes the internal clock 104 to continue on as the system clock SYSCLK.

Figure 3:
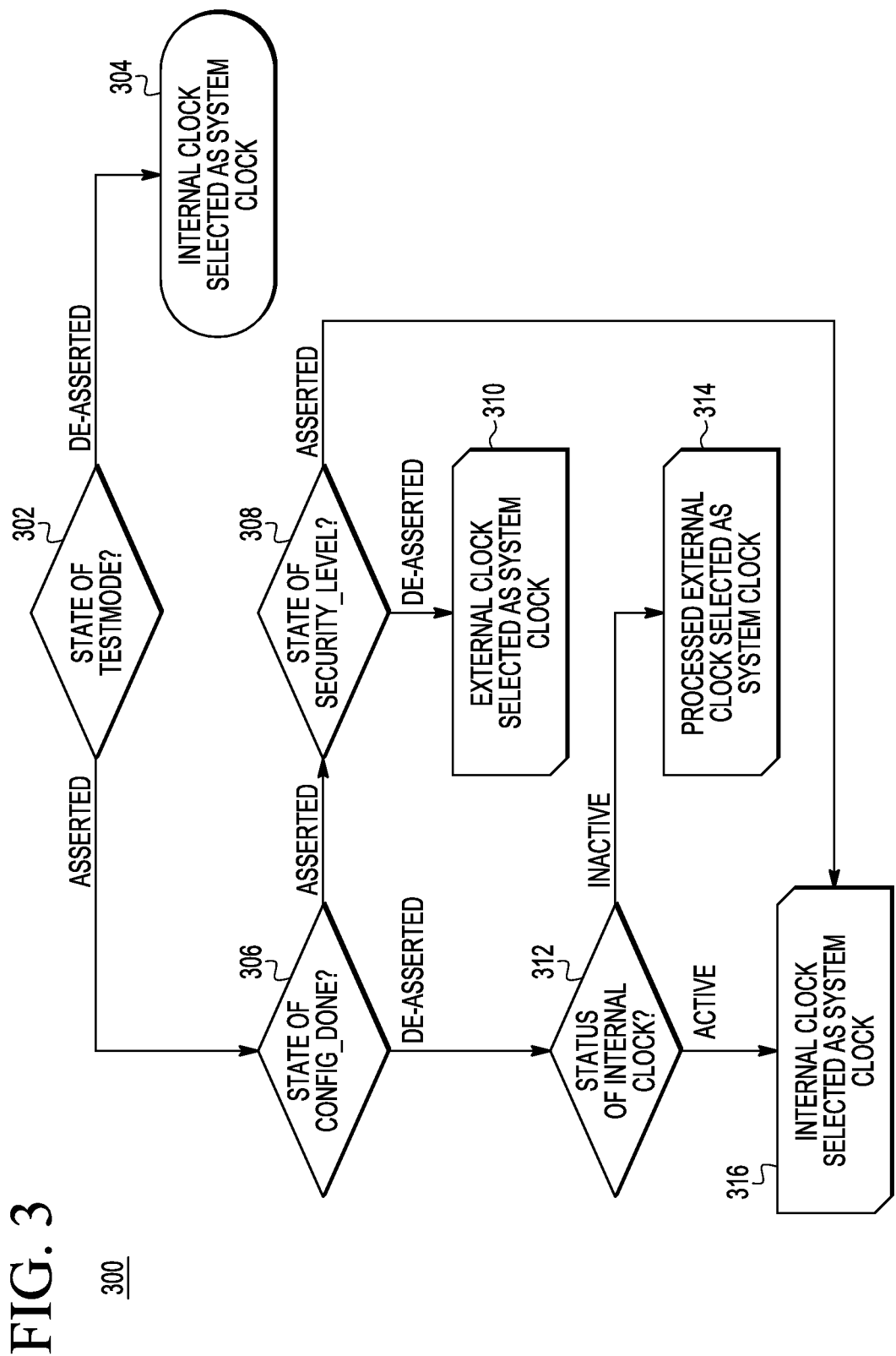
FIG. 3 is a flow chart of a method of clock switching that can be implemented in the IC of FIG. 1 according to an embodiment of the invention.

FIG. 3 is a flowchart that illustrates a method 300 of clock switching that can be implemented in the IC 100 (FIG. 1) according to an embodiment of the invention. For example, an embodiment of the intelligent clock switch 110 may be designed and configured to carry out the method 300 in the IC 100. Example circuits that can be used for this purpose in the intelligent clock switch 110 and their example operation are described in more detail below in reference to FIGS. 4-8.

At step 302 of the method 300, the state of the control signal TESTMODE is determined. If the control signal TESTMODE is de-asserted, then the processing of the method 300 is directed to step 304. If the control signal TESTMODE is asserted, then the processing of the method 300 is directed to step 306.

At step 304, the internal clock 104 is selected as the system clock SYSCLK.

At step 306, the state of the control signal CONFIG_DONE is determined. If the control signal CONFIG_DONE is asserted, then the processing of the method 300 is directed to step 308. If the control signal CONFIG_DONE is de-asserted, then the processing of the method 300 is directed to step 312.

At step 308, the state of the control signal SECURITY_LEVEL is determined. If the control signal SECURITY_LEVEL is de-asserted, then the processing of the method 300 is directed to step 310. If the control signal SECURITY_LEVEL is asserted, then the processing of the method 300 is directed to step 316.

At step 310, the external clock 102 is selected as the system clock SYSCLK.

At step 312, the status of the internal clock 104 is determined. If the internal clock 104 is inactive, then the processing of the method 300 is directed to step 314. If the internal clock 104 is active, then the processing of the method 300 is directed to step 316.

At step 314, the external clock 102 is subjected to appropriate additional signal processing, and the resulting processed clock is selected as the system clock SYSCLK.

At step 316, the internal clock 104 is selected as the system clock SYSCLK.

The method 300 may be re-executed if the state of any of the control signals TESTMODE, CONFIG_DONE, and SECURITY_LEVEL changes, or if the status of the internal clock 104 changes.

Figure 4:
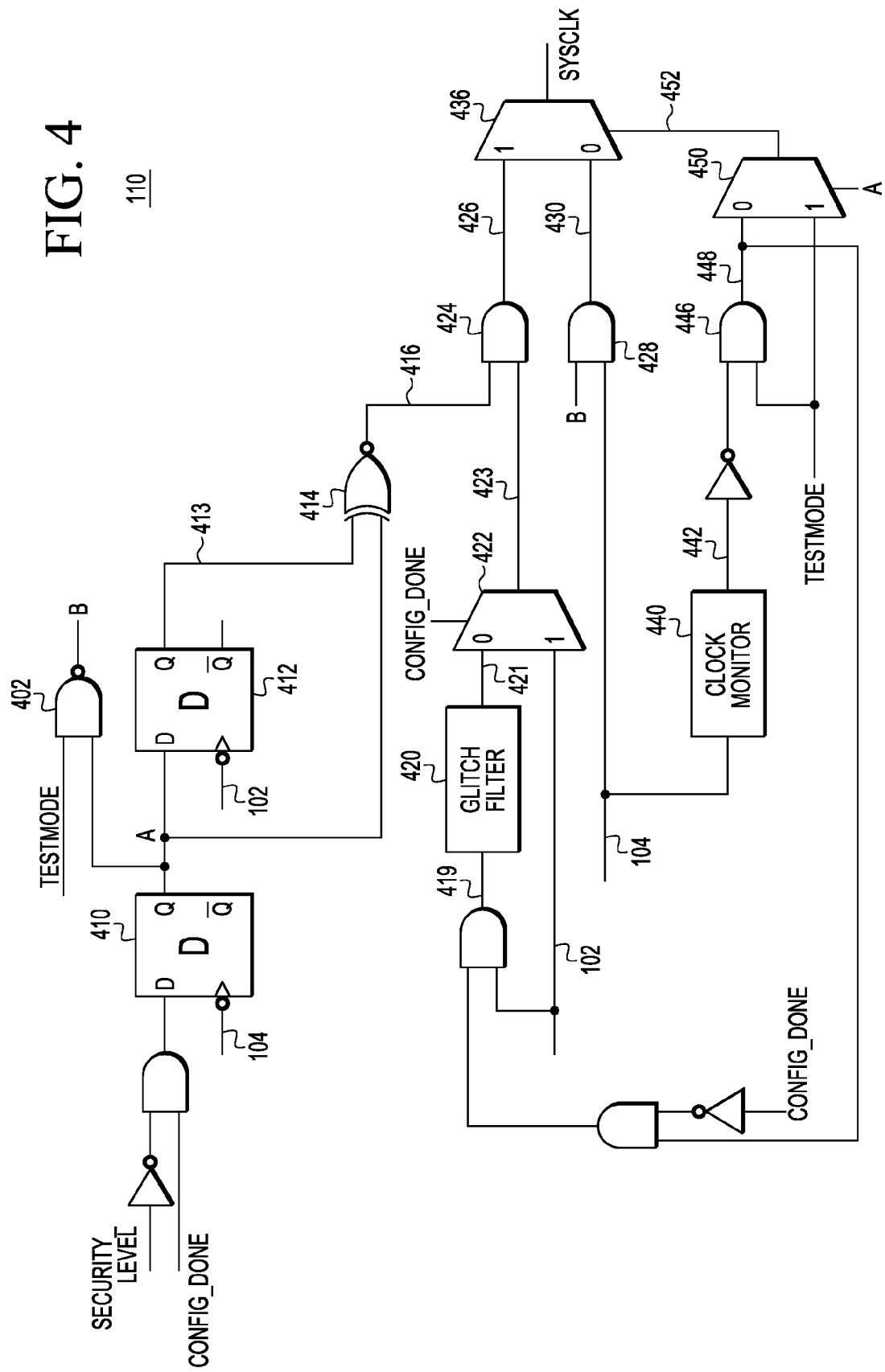
FIG. 4 is a schematic circuit diagram of a circuit that can be used in the IC of FIG. 1 according to an embodiment of the invention.

FIG. 4 is a circuit diagram that illustrates the intelligent clock switch 110 (FIG. 1) according to an embodiment of the invention. The circuitry of the intelligent clock switch 110 shown in FIG. 4 can carry out the method 300 (FIG. 3), e.g., as explained in more detail below.

As shown in FIG. 4, the intelligent clock switch 110 employs a glitch filter 420 and a clock monitor 440. The glitch filter 420 operates to generate an output signal 421 by removing glitches from an input signal 419. The clock monitor 440 operates to generate a clock-status signal 442 by determining the status of the internal clock 104. The clock-status signal 442 is high when the internal clock 104 is functional. Otherwise, the clock-status signal 442 is low. An example circuit that can be used as the clock monitor 440 is described in more detail below in reference to FIG. 5.

If the control signal TESTMODE is de-asserted, then an output signal B of a NAND gate 402 is high regardless of the logic level of an output signal A generated at the Q port of a flip-flop 410. If the output signal B is high, then the internal clock 104 is passed as an output signal 430 of an AND gate 428. It can be easily verified that an input-select signal 452 that controls the configuration of a multiplexer 436 is low for all four possible combinations of the values of the control signals SECURITY_LEVEL and CONFIG_DONE. As a result, the signal 430 is passed through by the multiplexer 436 as the system clock SYSCLK, thereby causing the internal clock 104 to be the system clock in accordance with step 304 of the method 300.

If the control signals TESTMODE and CONFIG_DONE are both asserted, then the system-clock selection depends on the state of the control signal SECURITY_LEVEL as explained below.

If the control signal SECURITY_LEVEL is asserted, then the output signal A generated at the Q port of the flip-flop 410 is low. The output signal B of the NAND gate 402 is high, which causes the internal clock 104 to be passed as the output signal 430 of the AND gate 428, as already explained above. The "low" state of the signal A causes a multiplexer 450 to generate the input-select signal 452 by passing through a signal 448 applied to the multiplexer's "0" input port by an AND gate 446. Provided that the clock-status signal 442 is high, the signal 448 is low, which causes the input-select signal 452 to also be low. As a result, the signal 430 is passed through by the multiplexer 436 as the system clock SYSCLK, thereby causing the internal clock 104 to be the system clock in accordance with step 316 of the method 300.

Figure 6:
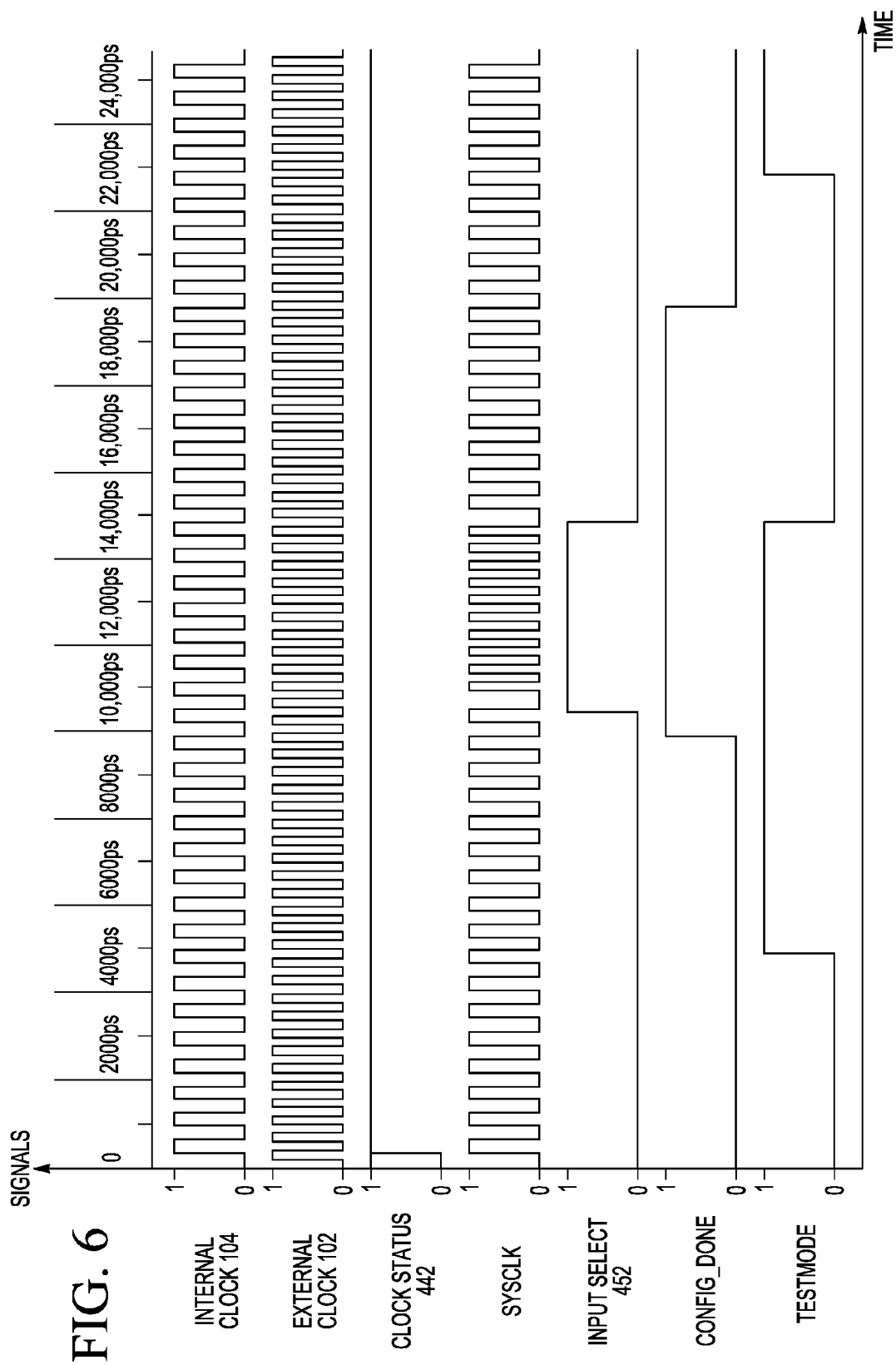

If the control signal SECURITY_LEVEL is de-asserted, then the output signal A generated at the Q port of the flip-flop 410 is high. The "high" state of the signal A causes the multiplexer 450 to generate the input-select signal 452 by passing through the control signal TESTMODE applied to the multiplexer's "1" input port, which causes the input-select signal 452 to also be high. As a result, an output signal 426 generated by an AND gate 424 is passed through by the multiplexer 436 as the system clock SYSCLK. With the control signal CONFIG_DONE being asserted and the control signal SECURITY_LEVEL being de-asserted, an output signal 413 of a flip-flop 412 goes high on the next positive edge of the external clock 102 after the output signal A has gone high. As a result, an output signal 416 of an XNOR gate 414 goes high aligned to the positive edge of the external clock 102, which causes the AND gate 424 to generate the output signal 426 to be the same as an output signal 423 of a multiplexer 422. Since the configuration of the multiplexer 422 is controlled by the control signal CONFIG_DONE (which is asserted), the multiplexer 422 generates the output signal 423 by passing through the external clock 102 applied to the multiplexer's "1" input port. Thus, the configurations of the multiplexer 422, the AND gate 424, and the multiplexer 436 are such that the external clock 102 applied to the "1" input port of the multiplexer 422 is passed through as the system clock SYSCLK in accordance with step 310 of the method 300. Because the above-described switching is aligned to the edge of the clock that is being switched to, it is ensured that the switching is glitch-less, e.g., as illustrated in FIG. 6.

If the control signal TESTMODE is asserted, but the control signal CONFIG_DONE is de-asserted, then the system-clock selection depends on the status of the internal clock 104 as explained below.

With the control signal CONFIG_DONE being de-asserted, the output signal A generated at the Q port of the flip-flop 410 is low regardless of the state of the control signal SECURITY_LEVEL. As a result, the multiplexer 450 generates the input-select signal 452 by passing through the signal 448 applied to the multiplexer's "0" input port by an AND gate 446.

If the clock-status signal 442 is high (meaning that the internal clock 104 is functional), then the signal 448 is low, which causes the input-select signal 452 to be low as well. As a result, the multiplexer 436 generates the system clock SYSCLK by passing through the output signal 430 of the AND gate 428. With the control signal TESTMODE being asserted and the output signal A generated at the Q port of the flip-flop 410 being low, the output signal B of the NAND gate 402 is high, which causes the internal clock 104 to be passed through as the output signal 430 of the AND gate 428, as already explained above. Thus, in this configuration, the internal clock 104 is selected as the system clock SYSCLK in accordance with step 316 of the method 300.

If the clock-status signal 442 is low (meaning that the internal clock 104 is not functional), then the signal 448 is high. As a result, the multiplexer 436 generates the system clock SYSCLK by passing through the output signal 426 generated by the AND gate 424. It can be easily verified that, in this configuration, the output signal 426 is the same as the output signal 421 of the glitch filter 420. Thus, in this configuration, the glitch-filtered external clock 102 is selected as the system clock SYSCLK in accordance with step 314 of the method 300.

Figure 5:
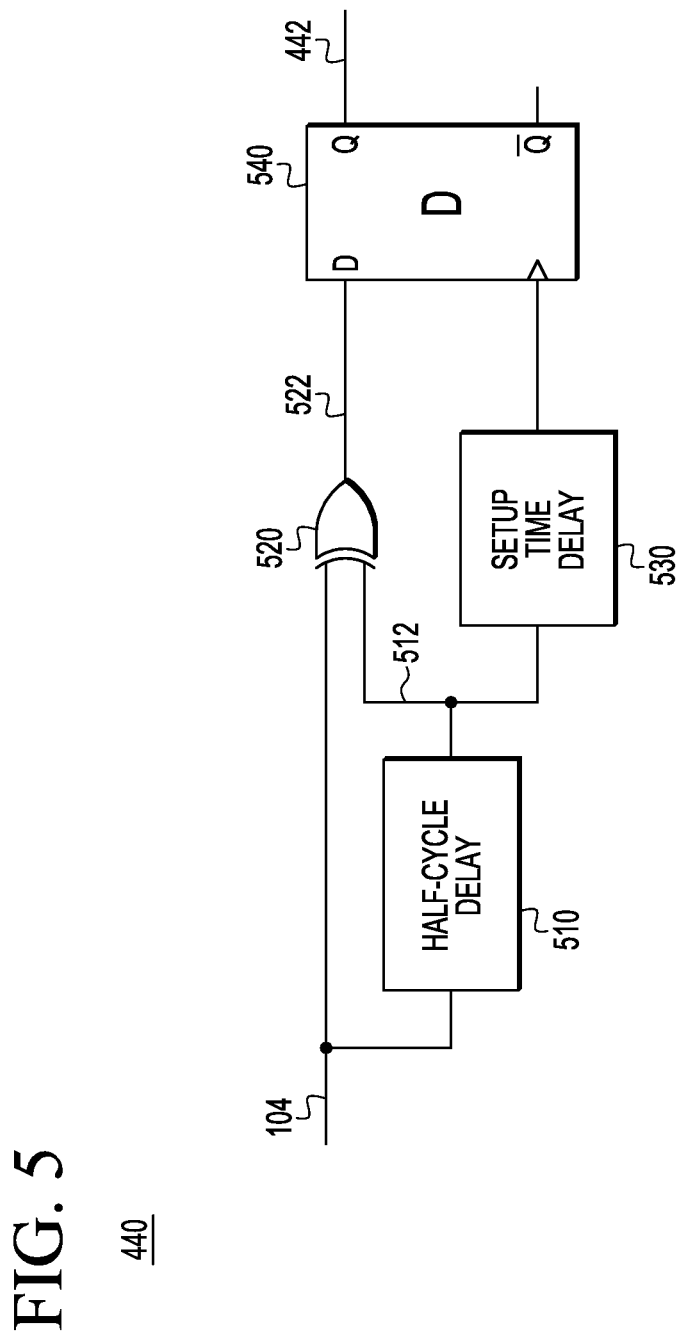
FIG. 5 is a schematic circuit diagram of another circuit that can be used in the IC of FIG. 1 according to an embodiment of the invention.

FIG. 5 is a circuit diagram that illustrates the clock monitor 440 (FIG. 4) according to an embodiment of the invention. The clock monitor 440 receives, as an input signal, the internal clock 104. The output signal of the clock monitor 440 is the clock-status signal 442 (also see FIG. 4). As already mentioned above, the clock-status signal 442 is high if the internal clock 104 is functional. Otherwise, the clock-status signal 442 is low.

The clock monitor 440 includes a delay element 510 that subjects the internal clock 104 to a time delay of T/2 to generate a delayed clock 512, where T is the period of the internal clock 104. The internal clock 104 and the delayed clock 512 are applied to an XOR gate 520. An output signal 522 generated by the XOR gate 520 is applied to a D port of a flip-flop 540. The flip-flop 540 is clocked using the delayed clock 512 after it is further delayed by a delay element 530, which serves to appropriately time the signals received by the flip-flop 540. The Q port of the flip-flop 540 outputs the clock-status signal 442.

If the internal clock 104 is not functional, then both inputs of the XOR gate 520 are low. As a result, the output signal 522 of the XOR gate 520 is low, which causes the clock-status signal 442 to be low as well.

If the internal clock 104 is functional, then one of the inputs of the XOR gate 520 is low while the other input is high. For example, if the internal clock 104 has a clock pulse, i.e., is high, then the delay element 510 causes the delayed clock 512 to be between clock pulses, i.e., to be low. On the other hand, if the internal clock 104 is between clock pulses, i.e., is low, then the delay element 510 causes the delayed clock 512 to be on a clock pulse, i.e., to be high. In either of these situations, the output signal 522 of the XOR gate 520 is high, which causes the clock-status signal 442 to be high as well.

Figure 7:
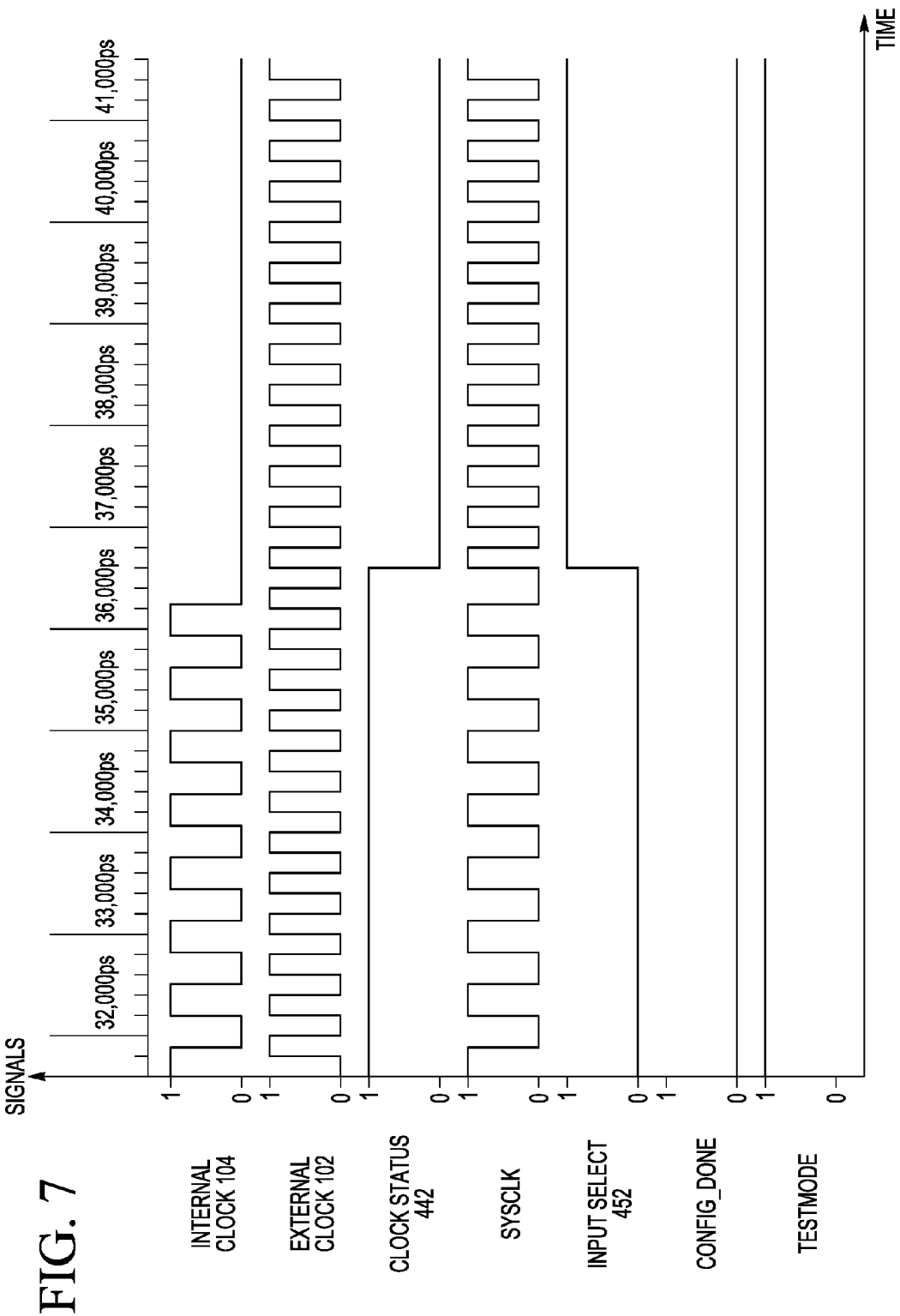

FIGS. 6-8 are timing diagrams that graphically illustrate various signals that can be generated in the intelligent clock switch 110 of FIG. 4 according to an embodiment of the invention.

FIG. 6 illustrates the operation of the intelligent clock switch 110 (FIG. 4) when the control signal TESTMODE is asynchronous with either the external clock 102 or the internal clock 104, or with both. Inspection of the waveform showing the system clock SYSCLK in FIG. 6 reveals glitch-less switching of the system clock SYSCLK from the internal clock 104 to the external clock 102 at the time t≈11 ns when both of the control signals TESTMODE and CONFIG_DONE become asserted. Note that there is a delay of approximately one clock period of the internal clock 102 for the input-select signal 452 to become asserted after the control signal CONFIG_DONE is asserted. Further inspection of the waveform showing the system clock SYSCLK in FIG. 6 reveals glitch-less switching of the system clock SYSCLK from the external clock 102 to the internal clock 104 at the time t≈15 ns if the control signals TESTMODE is de-asserted.

FIG. 7 illustrates the operation of the intelligent clock switch 110 (FIG. 4) when the internal clock 104 becomes non-functional and zeros out at the time t≈36.5 ns while the SSCC 120 is still performing device configurations (which is manifested by the control signal CONFIG_DONE still being de-asserted). Prior to the time t≈36.5 ns, the internal clock 104 is selected as the system clock SYSCLK despite the control signal TESTMODE being asserted because the clock-status signal 442 is high. When the internal clock 104 starts malfunctioning, the clock-status signal 442 goes low, which causes the input-select signal 452 to go high. As a result, at the time t≈36.6 ns, the system clock SYSCLK is switched from the internal clock 104 to the external clock 102 in a glitch-less manner.

FIG. 8 illustrates the operation of the intelligent clock switch 110 (FIG. 4) when the external clock 102 has glitches. More specifically, the situation shown in FIG. 8 is similar to the situation shown in FIG. 7 in that the internal clock 104 becomes non-functional and zeros out at the time t≈1800 ns while the SSCC 120 is still performing device configurations (which is manifested by the control signal CONFIG_DONE still being de-asserted). As a result, at the time t≈1800 ns, the system clock SYSCLK is switched from the internal clock 104 to the external clock 102. Thereafter, any glitches in the external clock 102, such as the glitch at the time t≈2330 ns, are filtered out by the glitch filter 420, e.g., as illustrated in FIG. 8 by the waveforms representing the filtered clock 421 and the system clock SYSCLK, which are both glitch-less at the time t≈2330 ns despite the corresponding glitch in the external clock 102.

It will be further understood that various changes in the details, materials, and arrangements of the parts which have been described and illustrated in order to explain the nature of this invention may be made by those skilled in the art without departing from the scope of the invention as expressed in the following claims.

For example, although illustrative embodiments are described above in reference to the system-clock selection being made from the external clock 102 and the internal clock 104, alternative embodiments are not so limited. In some embodiments, the intelligent clock switch 110 may be configured to select the system clock SYSCLK for the IC 100 from two different internal clocks (e.g., having different respective frequencies and/or generated using two different on-chip clock generators) or from two different external clocks.

Furthermore, although illustrative embodiments are described above in reference to an example in which the security attack is perpetrated using the peripheral TEST-MODE pin, the disclosed intelligent clock switch 110 or an equivalent thereof is also operable to prevent a security breach that might be attempted using any other relevant external port or pin of the host IC.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

The invention claimed is:

1. An integrated circuit, comprising:
   an embedded nonvolatile memory having stored therein device configuration data corresponding to the integrated circuit;
   a configuration circuit that sets an operative configuration of the integrated circuit based on the device configuration data stored in the embedded nonvolatile memory;
   a clock switch that selects a system clock of the integrated circuit from a first clock and a second clock, said selection being performed based on whether the configuration circuit has finished setting the operative configuration of the integrated circuit,
   wherein the first clock is an externally generated clock received by the integrated circuit by way of a peripheral pin, and the second clock is an internally generated clock, and
   wherein the clock switch comprises a clock monitor that determines a status of the second clock, wherein the clock monitor comprises:
   a delay element that generates a delayed internal clock by applying a half-cycle time delay to the internal clock;
   an XOR gate that receives the internal clock and the delayed internal clock and generates an output signal; and
   a flip-flop that generates a clock-status signal based on the XOR gate output signal, wherein the clock-status signal has a first logic state if the internal clock is functional, and a second logic state if the internal clock is not functional; and
   one or more device-configuration-format-records (DCFR) registers, and wherein the configuration circuit (i) generates device-configuration-format (DCF) records based on the device configuration data retrieved from the embedded nonvolatile memory, (ii) stores said DCF records in the DCFR registers, wherein the DCF records are retrievable from the DCFR registers by at least one sub-circuit of the integrated circuit in a manner that determines a behavior of the at least one sub-circuit during operation of the integrated circuit, (iii) sets a security level to be used in the integrated circuit based on the device configuration data retrieved from the embedded nonvolatile memory, and (iv) stores a value representing the security level in the DCFR registers as part of the DCF records.

2. The integrated circuit of claim 1, wherein the configuration circuit is clocked by the system clock.

3. The integrated circuit of claim 1, wherein the device configuration data stored in the embedded nonvolatile memory include a life-cycle state of the integrated circuit.

4. The integrated circuit of claim 1, wherein the configuration circuit sets a security level to be used in the integrated circuit based on the device configuration data.

5. The integrated circuit of claim 4, wherein said selection is further based on the security level.

6. The integrated circuit of claim 1, wherein the clock switch selects the system clock in a manner that enables the integrated circuit to finish the setting of the operative configuration if the second clock is not functional.

7. The integrated circuit of claim 6, wherein:
   if the configuration circuit has not finished setting the operative configuration of the integrated circuit and the clock monitor determines that the second clock is functional, then the clock switch selects the second clock as the system clock.

8. The integrated circuit of claim 7, wherein:
   the clock switch further comprises a clock filter that generates a filtered clock by filtering the first clock; and
   if the configuration circuit has not finished setting the operative configuration of the integrated circuit and the clock monitor determines that the second clock is not functional, then the clock switch selects the filtered clock as the system clock.

9. The integrated circuit of claim 8, wherein the filtering performed by the clock filter prevents a glitch in the first clock from appearing in the filtered clock.

10. The integrated circuit of claim 1, wherein the clock switch selects the system clock based on whether the integrated circuit is in a test mode of operation.

11. The integrated circuit of claim 10, wherein the integrated circuit enters the test mode of operation if a test-mode control signal is asserted by way of an externally generated control signal being received by the integrated circuit at a corresponding peripheral pin.

12. A method of selecting a system clock in an integrated circuit, the method comprising:
   storing device configuration data corresponding to the integrated circuit in an embedded nonvolatile memory;

setting an operative configuration of the integrated circuit based on the device configuration data;

selecting the system clock from a first clock and a second clock using a clock switch, said selecting being performed based on whether the step of setting the operative configuration has been completed, wherein the first clock is an externally generated clock received by the integrated circuit by way of a peripheral pin, and the second clock is an internally generated clock;

determining a status of the second clock using a clock monitor of the clock switch, wherein the clock monitor comprises:

a delay element that generates a delayed internal clock by applying a half-cycle time delay to the internal clock;

an XOR gate that receives the internal clock and the delayed internal clock and generates an output signal; and a flip-flop that generates a clock-status signal based on the XOR gate output signal, wherein the clock-status signal indicates if the internal clock is functional; and setting a security level to be used in the integrated circuit based on the device configuration data retrieved from the embedded nonvolatile memory, wherein said selecting the system clock is further based on the security level.

13. The method of claim 12, wherein said selecting comprises selecting the system clock in a manner that enables the integrated circuit to finish the setting of the operative configuration if the second clock is not functional.

\* \* \* \* \*